(12) United States Patent
Kawasaki et al.

(10) Patent No.: US 10,826,743 B2
(45) Date of Patent: Nov. 3, 2020

(54) WIRELESS COMMUNICATION DEVICE AND WIRELESS COMMUNICATION METHOD

(71) Applicant: FUJITSU LIMITED, Kawasaki-shi, Kanagawa (JP)

(72) Inventors: Yoshihiro Kawasaki, Kawasaki (JP); Takayoshi Ode, Yokohama (JP); Hiroyasu Murata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/200,131

(22) Filed: Nov. 26, 2018

(65) Prior Publication Data
US 2019/0097861 A1    Mar. 28, 2019

Related U.S. Application Data

(63) Continuation of application No. PCT/JP2016/002711, filed on Jun. 3, 2016.

(51) Int. Cl.
*H04L 27/26* (2006.01)
*H04L 5/00* (2006.01)
(Continued)

(52) U.S. Cl.
CPC ........ *H04L 27/2666* (2013.01); *H04L 5/0053* (2013.01); *H04L 27/2602* (2013.01);
(Continued)

(58) Field of Classification Search
CPC ............. H04W 72/02; H04W 72/2666; H04W 72/2602; H04W 72/0446; H04W 72/0406;
(Continued)

(56) References Cited

U.S. PATENT DOCUMENTS

2018/0041325 A1* 2/2018 Lee ................. H04L 5/001
2018/0063818 A1* 3/2018 Chen ............... H04W 24/02
(Continued)

FOREIGN PATENT DOCUMENTS

WO    2016/064059 A1    4/2016

OTHER PUBLICATIONS

Huawei Technologies, "Vision on 5G Radio Access Technologies", 3GPP RAN workshop on 5G, RWS-150006, Phoenix, USA, Sep. 17-18, 2015.
(Continued)

*Primary Examiner* — Brian D Nguyen
(74) *Attorney, Agent, or Firm* — Myers Wolin, LLC.

(57) ABSTRACT

A wireless communication device which receives a data signal and a first control signal associated with the data signal from another wireless communication device, the wireless communication device includes a receiver configured to receive, from the another wireless communication device, a series of first frames having a first frame length through a first subband and a series of second frames having a second frame length through a second subband, the second frame length differing from the first frame length, and a processor configured to obtain the first control signal of the first frame through the first subband and the data signal associated with the first control signal of the second frames through the second subband, and specify which of the second frames includes the data signal, based on predetermined information included in the first control signal.

11 Claims, 11 Drawing Sheets

(51) Int. Cl.
    *H04W 72/04* (2009.01)
    *H04W 72/02* (2009.01)
(52) U.S. Cl.
    CPC ............. *H04W 72/02* (2013.01); *H04L 5/001* (2013.01); *H04L 5/0044* (2013.01); *H04L 5/0048* (2013.01); *H04W 72/0406* (2013.01); *H04W 72/0446* (2013.01)
(58) Field of Classification Search
    CPC ..... H04L 5/0053; H04L 5/001; H04L 5/0048; H04L 5/0044
    See application file for complete search history.

(56) References Cited

U.S. PATENT DOCUMENTS

| | | | | |
|---|---|---|---|---|
| 2018/0076924 | A1* | 3/2018 | Lee | H04L 1/0026 |
| 2018/0077722 | A1* | 3/2018 | Awad | H04W 74/002 |
| 2018/0102806 | A1* | 4/2018 | Yi | H04L 5/003 |
| 2018/0131482 | A1* | 5/2018 | Zhou | H04W 72/1215 |
| 2018/0159664 | A1* | 6/2018 | You | H04L 27/26 |
| 2018/0192442 | A1* | 7/2018 | Li | H04L 5/0048 |

OTHER PUBLICATIONS

ITU-R, "Recommendation ITU-R M.2083-0, IMT Vision-Framework and overall objectives of the future development of IMT for 2020 and beyond", Sep. 2015.

3GPP TR 38.913 V0.3.0, "3rd Generation Partnership Project; Technical Specification Group Radio Access Network; Study on Scenarios and Requirements for Next Generation Access Technologies; (Release 14)", Mar. 2016.

3GPP TR 22.891 V14.0.0, "3rd Generation Partnership Project; Technical Specification Group Services and System Aspects; Feasibility Study on New Services and Markets Technology Enablers; Stage 1 (Release 14)", Mar. 2016.

Nokia et al., "Carrier Aggregation in Standalone NR", Agenda Item: 9.4.13, 3GPP TSG-RAN WG2 Meeting #94, R2-163685, Nanjing, China, May 23-27, 2016.

Qualcomm Incorporated, "Aggregation scenarios for NR", Agenda Item: 9.2, 3GPP TSG-RAN WG2 Meeting #93bis, R2-162730, Dubrovnik, Croatia, Apr. 11-15, 2016.

Samsung, "Preliminary evaluation results for OFDMA-based waveforms", Agenda Item: 7.13.1, 3GPP TSG-RAN WG1 Meeting #85, R1-163990, Nanjing, China, May 23-27, 2016.

International Search Report and Written Opinion of the International Searching Authority issued by the Japan Patent Office for corresponding International Patent Application No. PCT/JP2016/002711, dated Aug. 16, 2016, with an English translation.

Notice of Reasons for Refusal issued by the Japan Patent Office for corresponding Japanese Patent Application No. 2018-520058, dated Jun. 9, 2020, with a full English machine translation.

Decision of Refusal issued by the Japan Patent Office for corresponding Japanese Patent Application No. 2018-520058 dated Aug. 25, 2020 with a full machine English translation.

* cited by examiner

WIRELESS COMMUNICATION DEVICE AND WIRELESS COMMUNICATION METHOD

CROSS-REFERENCE TO RELATED APPLICATION

This application is a continuation application of International Application PCT/JP2016/002711 filed on Jun. 3, 2016 and designated the U.S., the entire contents of which are incorporated herein by reference.

FIELD

The present disclosure relates to a wireless communication device and a wireless communication method.

BACKGROUND

Technologies to further increase the speed (peak data rate, data throughput, . . . ) and capacity of data transmission in wireless access part of wireless communication systems, such as mobile phone systems (cellular systems), are continuously being studied. The 3rd Generation Partnership Project (3GPP), one of organizations developing and managing wireless-communication-system standards has developed a standard called Long Term Evolution (LTE), and continues its enhancements.

The 3GPP has started developing the standard of the fifth generation mobile communication systems (hereinafter, referred to as 5G systems) that implement operation scenarios and comply with technical requirements demanded by the International Telecommunication Union Radiocommunications Sector (ITU-R). The 3GPP is expected to actively conduct discussions to realize mobile communication systems that satisfy the requirements from ITU-R.

The requirements for 5G systems include provision of a network that can exhibit optimal performance for various services (in other words, applications or use cases). In so-called 4th generation mobile communication systems (hereinafter, referred to as 4G systems), such as LTE or LTE Advanced (LTE-A) systems, for example, basic physical-layer parameters, including Transmission Time Interval (TTI) length and OFDM subcarrier spacing (or subcarrier interval), for example, are identical irrespective of the services. In fact, the TTI length in LTE systems corresponds to the subframe length and is a fixed value of 1 ms. The same LTE wireless cell employs the same (one type of) OFDM subcarrier spacing (15 kHz, for example).

Meanwhile, it is supposed that mission critical services, such as remote medical treatments and automobile self-driving, for example, will be implemented on wireless networks in the future. If the TTI length is fixed to 1 ms, for example, it is supposed that such TTI may not cope with very low latency requirement for mission critical services. 5G systems are expected to provide wireless communication in millimeter-wave frequency spectrums. In such a very high frequency spectrum, communications are strongly influenced by Doppler shift or phase noise of device circuits. The OFDM subcarrier spacing therefore requires to be wider enough.

Many companies have proposed that 5G systems should be capable of handling of a mixture of wireless signals having wireless parameters adaptively configurable according to services and wireless communication environments. 5G systems will be standardized with such a proposition being considered as one of the objectives of implementing 5G systems in the future. This will provide wireless signals having a TTI length short enough (0.1 to 0.2 ms, for example) for wireless communications performed in services that require low delay and wireless signals having OFDM subcarrier intervals wide enough, for example, for wireless communications performed in the super high frequency range.

In such a 5G system, the wireless access part is supposed to be provided with optimal wireless signals depending on the type of service and wireless communication environments. On the network side, it is supposed that the network is sliced into multiple logical networks optimized for individual services. This concept, called network slicing, is already shared by researchers while the discussion about the standardization of 5G has just begun.

Examples of the related art include RWS-150006 "Vision on 5G Radio Access Technologies," Huawei, 3GPP RAN workshop on 5G (Sep. 17-18, 2015); ITU-R Recommendation ITU-R M. 2083-0 "IMT Vision—Framework and overall objectives of the future development of IMT for 2020 and beyond"; 3GPP TR38.913 v0.3.0 "Study on Scenarios and Requirements for Next Generation Access Technologies"; and 3GPP TR22.891 v14.0.0 "Study on New Services and Markets Technology Enablers"

SUMMARY

According to an aspect of the invention, a wireless communication device which receives a data signal and a first control signal associated with the data signal from another wireless communication device, the wireless communication device includes a receiver configured to receive, from the another wireless communication device, a series of first frames having a first frame length through a first subband and a series of second frames having a second frame length through a second subband, the second frame length differing from the first frame length, and a processor configured to obtain the first control signal of the first frame through the first subband and the data signal associated with the first control signal of the second frames through the second subband, and specify which of the second frames includes the data signal, based on predetermined information included in the first control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
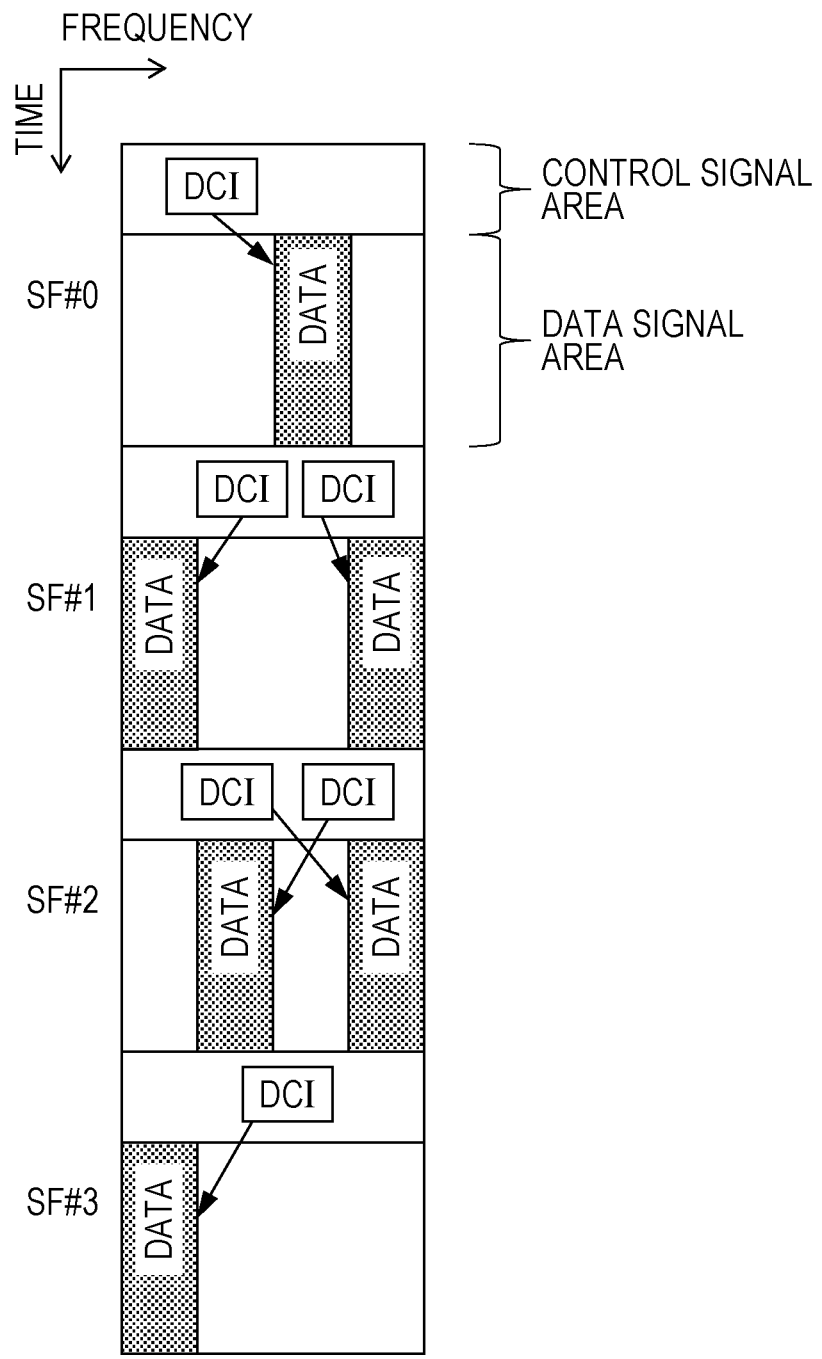
FIG. 1 is a diagram illustrating an example of single-carrier (or same carrier) scheduling in an LTE system.

As described above, the 3GPP has just begun the discussion on wireless networks allowing the wireless access part to include physical-layer parameters having values that can vary and has not been deeply discussed yet. The 3GPP has not sufficiently studied the wireless access part, particularly the configuration of physical layers (or Layer 1) or scheduling (assignment of wireless resources to data transmission to/from wireless terminals), in the case where radio parameters, especially TTI length, have values that can vary. The method of transmitting data signals and their associated control signals and the method of the association thereof were therefore not studied in the case where different TTI lengths co-exist, and there seem no desirable scheduling mechanisms for the case.

In the application, the expression "scheduling" (or performs scheduling) is defined in terms of associating a data signal to be transmitted with a control signal corresponding thereto. Herein, in LTE, the above-described data signal and control signal associated with the data signal correspond to Physical Downlink Shared Channel (PDSCH) and Physical Downlink Control Channel (PDCCH), or enhanced PDCCH (EPDCCH), respectively.

Hereinafter, a description is given of an embodiment of a wireless communication device and a wireless communication method disclosed in this specification with reference to the drawings. The following embodiment will not limit the wireless terminal, wireless communication base station, and wireless communication method disclosed herein.

First, a description is given of a problem involved in the conventional techniques before explaining the embodiment. The inventors have become aware of the problem as the results of studying the conventional techniques in detail. Noted that the problem had not been known.

As described above, 5G systems are supposed to operate in a wireless network in which wireless parameters include values that vary, in other words, different TTI lengths (different subframe lengths) or different OFDM subcarrier spacing, for example, can coexist. Such a wireless network is thought to be implemented more easily than ever before by using a wireless multiple access method based on Filtered Orthogonal Frequency Division Multiplexing (OFDM), which will be possibly introduced to 5G systems, for example.

In the orthogonal frequency division multiple access (OFDMA), which is a multiple access scheme employed by 4G systems (LTE systems), the subcarrier spacings of an OFDM signal require to be the same in order to keep the orthogonality between subcarriers in the band of the used OFDM wireless signal and reduce interference therebetween. In other words, one OFDM signal uses only the single subcarrier spacing and does not include different subcarrier spacings. Herein, to provide plural subbands including different subcarrier spacings by using the conventional OFDM techniques, for example, 4G systems need to employ plural OFDM signals so that the OFDM signals correspond to the respective subbands and have subcarrier spacings different from each other.

In Filtered OFDM, which will be possibly introduced to 5G systems, an OFDM signal is divided in the frequency domain into plural subbands with guard bands provided between adjacent subbands, and a filter is inserted for each subband to shape the spread of the waveform in the frequency domain. The use of the filters reduce inter-subband interference even when OFDM subcarrier spacings vary from subband to subband. According to Filtered OFDM, the subcarrier spacing of each subband may be different, for example, the OFDM subcarrier spacing of a certain subband is 15 kHz while the OFDM subcarrier spacing of its adjacent subband is 60 kHz. Furthermore, it is possible to make cyclic prefix (CP) length or guard interval (GI) length different from subband to subband.

Next, a description is given of downlink data communication in 4G systems before returning to discussion of 5G systems. Herein, "downlink" indicates the direction of communication from a wireless base station to a wireless terminal. On the other hand, "uplink" indicates the direction of communication from the wireless terminal to the wireless base station.

In 4G systems, that is, LTE systems, the specifications of which are developed by the 3GPP, generally, when a wireless base station transmits downlink data to a wireless terminal, for example, a downlink data signal and a downlink control signal are associated with each other to be transmitted in the same radio subframe. Herein, in LTE systems, downlink control information is referred to as Downlink Control Information (DCI) and is transmitted using Physical Downlink Control Channel (PDCCH). Data signals are transmitted using Physical Downlink Shared Channel (PDSCH). DCI includes various types of control information (the arrangement position of the wireless resource used for transmission of PDSCH, the modulation method, HARQ-related information, and the like) required for a wireless terminal to receive and decode received PDSCH.

FIG. 1 illustrates downlink subframes in an LTE system. FIG. 1 corresponds to the case where downlink communication employs singlecarrier (or same carrier) scheduling. FIG. 1 illustrates successive four subframes SF #0 to SF #3 by way of example. As illustrated in FIG. 1, in LTE systems, a control signal area is located in the front of each downlink subframe, and the other part in the subframe is a data signal area. As illustrated in FIG. 1, DCI as the aforementioned downlink control information is included in PDCCH, and the PDCCH is provided in the control signal area. The data signal is included in PDSCH, and the PDSCH is provided in the data signal area. The data signal area may include an enhanced control signal area in which an enhanced PDCCH (EPDCCH) as an enhanced control signal is provided.

In LTE systems, basically, a wireless terminal receives each downlink subframe and performs so-called blind decoding in the control signal area of the received downlink subframe to check whether the control signal area includes PDCCH addressed to the wireless terminal itself (this process is generally called search). When detecting a PDCCH addressed to the wireless terminal itself in the received downlink subframe, the wireless terminal acquires PDSCH associated with the detected PDCCH in the downlink subframe based on various types of information in DCI included in the PDCCH. To be more specific, DCI includes Resource Block (RB) assignment that is a parameter indicating the position in the frequency direction, of PDSCH including the data signal addressed to the wireless terminal itself in the downlink subframe. Based on this RB assignment, the wireless terminal extracts the downlink data signal from the downlink subframe. DCI also includes Modulation and Coding Scheme (MCS), HARQ-related information, and the like, which are parameters indicating the modulation type and coding system (coding rate) applied to the associated PDSCH. Based on these parameters, the wireless terminal demodulates and decodes the extracted downlink data signal to acquire data signal for the wireless terminal.

LTE systems can provide not only single-carrier communication but also multi-carrier (multiple carriers) communication. Herein, the "carrier" means a frequency range and may be considered as a concept corresponding to the aforementioned band. One carrier is configured for one OFDM signal. Multicarrier wireless communication in LTE systems is referred to as communication based on carrier aggregation. Each of multiple carriers is sometimes called a component carrier (CC) and also called a cell in the LTE specifications.

With carrier aggregation, wireless communication in a certain direction (uplink or downlink) may use plural frequency ranges. In downlink communication using two CCs (carriers), for example, the frequency range (communication capacity) can be double the range in single-carrier cases. In CA of LTE, eight CCs may be aggregated for use at maximum.

When carrier aggregation is applied to downlink communication, plural CCs independently schedule themselves, or a certain CC among plural CCs may schedule the other CCs (including the certain CC). In the former case, the downlink data signal and downlink control signal corresponding thereto are transmitted and received through the same CC. In the latter case, the downlink data signal and downlink control signal corresponding thereto may be transmitted and received through different CCs. The scheduling method of the latter case is called cross-carrier scheduling.

Figure 2:
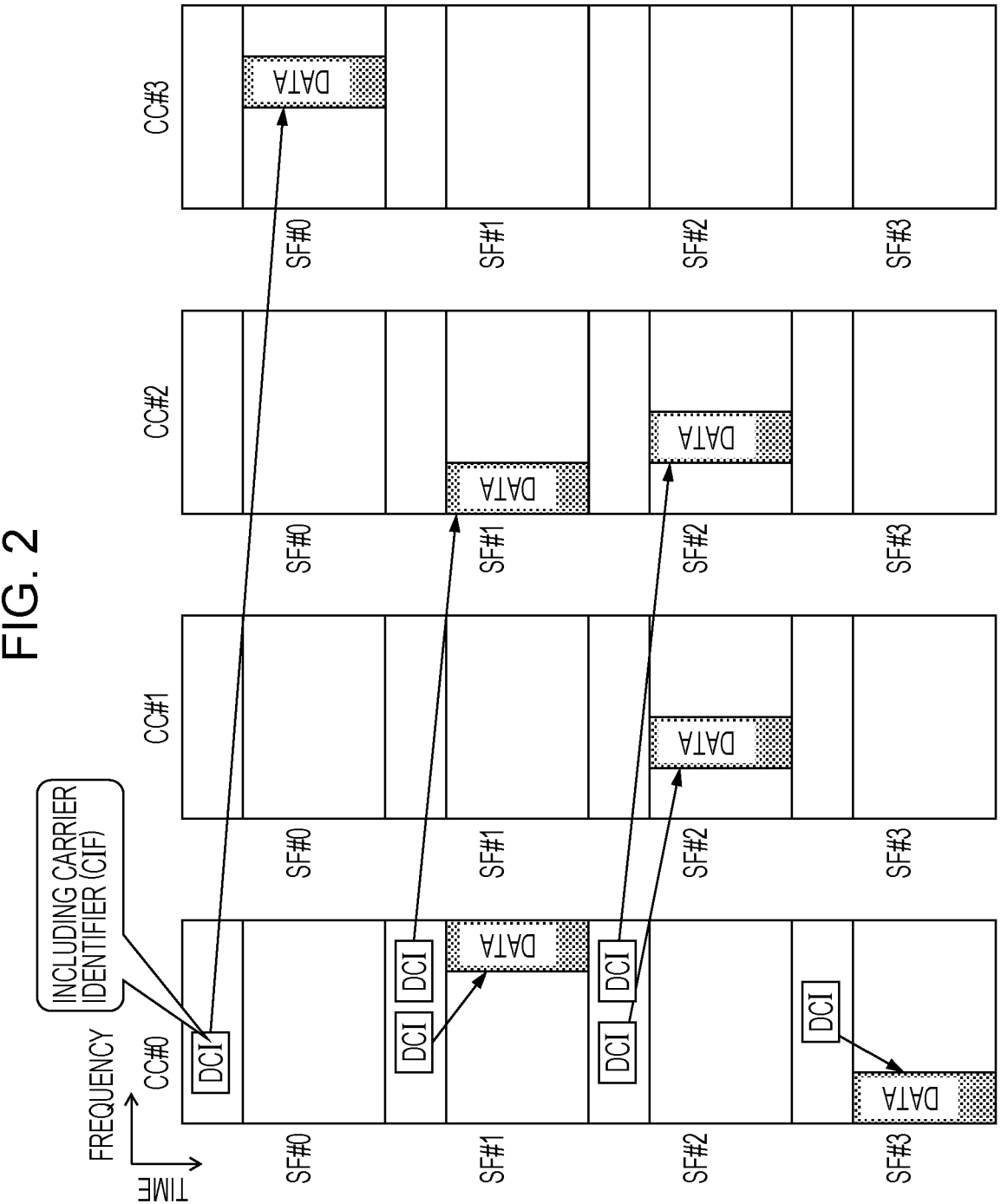
FIG. 2 is a diagram illustrating an example of cross-carrier scheduling in an LTE system.

FIG. 2 illustrates downlink subframe examples when cross-carrier scheduling is applied in an LTE system. FIG. 2 illustrates the case where downlink communication uses four component carriers CC #0 to CC #3.

In FIG. 2, scheduling for the four component carriers CC #0 to CC #3 are comprehensively performed by CC #0. In this process, PDSCH including a data signal is transmitted through one of CC #0 to CC #3 while PDCCH including the downlink control information (DCI) corresponding to the PDSCH is transmitted only through CC #0. In this case, CC #0 is sometimes referred to as a scheduling carrier. FIG. 2 illustrates the case where the number of scheduling carriers is one by way of example. The number of scheduling carriers may be plural. The scheduling carriers may be different between wireless terminals or may be changed under predetermined conditions. Furthermore, the component carrier through which PDSCH is transmitted may be switched to CC #0 to CC #3 for each subframe.

Generally, downlink control information is more important than downlink data and requires to be transmitted and received reliably. In LTE, HARQ retransmission is not applied to PDCCH used to transmit downlink control information (DCI). In this light, according to cross-carrier scheduling, setting the scheduling carrier to a CC of good radio quality (less interfered) allows for more reliable transmission and reception of the downlink control information.

When cross-carrier scheduling is applied to transmission and reception of a downlink control signal through a CC of good radio quality, downlink data signals happen to be transmitted or received through a CC of poor radio quality. It is certainly desirable that downlink data signals be also transmitted through a CC of good radio quality. However, downlink data signals can be large in size and may not be accommodated all at once in the area of a radio subframe in many cases. When the radio quality is poor, the certainty may be improved by reducing the coding ratio. Furthermore, HARQ is applied to PDSCH used to transmit data signals. Accordingly, the requirement for downlink data signal transmission through a CC of good radio quality is lower than for downlink control signal transmission.

Herein, in the case of single carrier communication as illustrated in FIG. 1, it goes without saying that the wireless terminal having detected PDCCH addressed to itself acquires PDSCH corresponding to the detected PDCCH from (the same subframe of) the same carrier. In the case where cross-carrier scheduling is applied as illustrated in FIG. 2, even though the wireless terminal detects DCI addressed to itself in CC #0, the wireless terminal may not immediately determine which of the four carrier components CC #0 to CC #3 the downlink data signal corresponding to the detected DCI is transmitted through, thus interfering with data acquisition.

The standard specifications of LTE systems prescribe that for downlink cross-carrier scheduling, DCI includes a parameter called carrier indicator field (CIF). CIF is a parameter (carrier identifier) indicating through which CC the PDSCH corresponding to the PDCCH used in transmission of the DCI is transmitted. When detecting the PDCCH addressed to itself, therefore, the wireless terminal is able to determine CC through which PDSCH corresponding to the detected PDCCH is transmitted, with reference to CIF in the DCI included in the PDCCH.

Based on downlink wireless communication in 4G systems (LTE systems) described above, discussion is given of problems in downlink wireless communication in 5G systems.

As described above, 5G systems are supposed to employ Filtered OFDM. In such a 5G system, the frequency range (or band) of one OFDM signal is divided into plural subbands (or a plurality of bandwidth parts); filtering is performed for each subband (or a bandwidth part: a part of carrier); and wireless parameters may vary from subband to subband. Herein, when Filtered OFDM technique is introduced into the wireless access part of 5G systems, it is thought that cross-carrier scheduling as used in 4G (LTE) systems may be performed in 5G systems by treating subbands in a Filtered OFDM signal in the same manner as aforementioned carrier components (CC). In this case, scheduling is performed across multiple subbands. Such scheduling is hereinafter referred to as cross-subband (or cross bandwidth part) scheduling for convenience.

Figure 3:
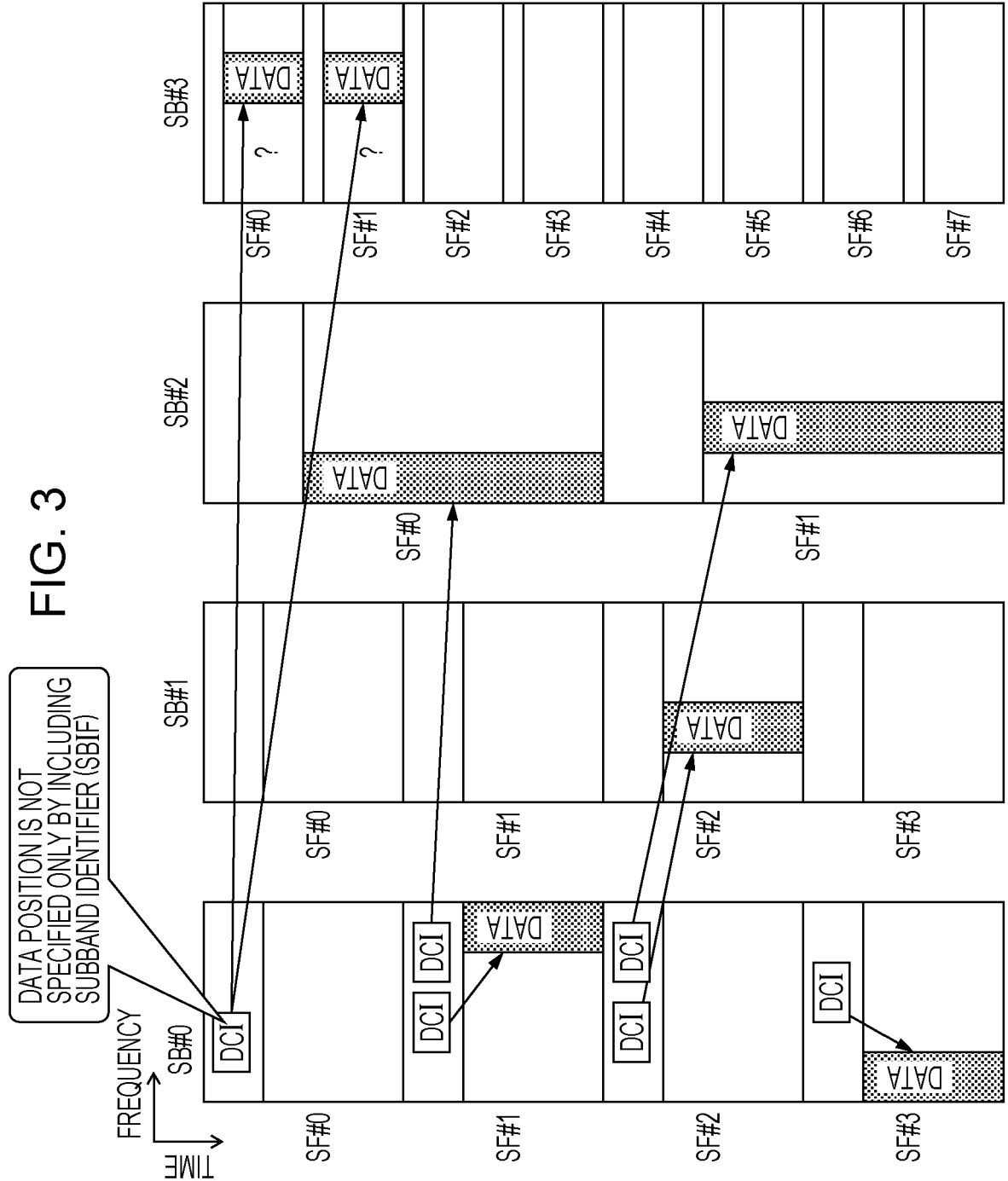
FIG. 3 is a diagram illustrating a problem example of cross-subband scheduling in a 5G system.

FIG. 3 illustrates an application example of cross-subband scheduling in a 5G system. In FIG. 3, the band (frequency range) of one Filtered OFDM signal is divided into four subbands SB #0 to SB #3 as an example. TTI (subframe length) of the subbands SB #0 to SB #3 is 1, 1, 2, and 0.5 ms, respectively. Subframe may be referred to as slot. In FIG. 3, it is assumed that the beginning of the first subframe (SF #0) in each subband is synchronized (aligned) with the beginnings of the other subbands by way of example.

In FIG. 3, as an example, SB #0 schedules the other subbands SB #1 to SB #3 (in addition to SB #0). The aforementioned cross-subband scheduling is thereby implemented. Herein, SB #0 is referred to as a "scheduling subband" for convenience. The scheduling subband may be referred to as a primary subband, a core subband, a master subband, a base subband, or the like, for example.

As illustrated in FIG. 3, when SB #0 as the scheduling subband performs cross-subband scheduling, a downlink control signal including downlink control information (DCI) is transmitted and received through SB #0. This downlink control signal corresponds to PDCCH in LTE can be called PDCCH but may be referred to as new radio PDCCH (NRPDCCH), to be discriminated from PDCCH in LTE, for example.

Noted that DCI herein requires to include a parameter (a subband identifier, or a bandwidth part indicator) corresponding to CIF in aforementioned cross-carrier scheduling. This parameter indicates which subband (or which bandwidth part of the carrier) is scheduled by DCI. The parameter may be therefore referred to as a subband indicator field (SBIF) for convenience. CIF, which is the aforementioned existing parameter, may be used instead of SBIF, which is the parameter newly set. Plural Filtered OFDM signals may be aggregated for use, and a certain subband in a Filtered OFDM signal schedules a subband in another Filtered OFDM. In this case, CIF in LTE and SBIF described above may be used in combination or may be integrated.

By introducing SBIF into DCI, the cross-subband scheduling in FIG. 3 is thought to be performed with no problem in a similar manner to the cross-carrier scheduling in FIG. 2. However, as described below, it is thought that the cross-subband scheduling in FIG. 3 may not appropriately cope with some situations only by introducing SBIF into DCI.

First, it goes without saying that no problems occur when SB #0 as the scheduling subband schedules a downlink data signal transmitted or received through SB #0 (left DCI in SF #1 and DCI in SF #3, of SB #0 in FIG. 3). When SB #0 schedules downlink data signals transmitted or received through SB #1 and SB #2, the scheduled subband is indicated by SBIF, and no problems occur (right DCI in SF #1 and two DCIs in SF #2, of SB #0 in FIG. 3).

When SB #0 schedules a downlink data signal transmitted and received through SB #3, the following problem will occur even if SBIF indicates the scheduled subband.

As illustrated in FIG. 3, for example, it is assumed that SF #0, which is the first subframe of SB #0 as the scheduling subband, schedules a downlink data signal transmitted and received through SB #3. In this process, the control signal including DCI as the control information associated with the downlink data signal is transmitted in SF #0 of SB #0. Herein, control is made so that this DCI includes SBIF indicating that the subband scheduled by the DCI is SB #3. The wireless terminal having received the control signal including this DCI refers to SBIF included in the DCI to recognize that the subband scheduled by the DCI is SB #3.

However, even in this case, the wireless terminal does not uniquely extract the downward data signal associated with the received DCI. This is because, as illustrated in FIG. 3, the wireless terminal does not uniquely recognize which of the two subframes SF #0 and SF #1 of the SB #3 includes the downlink data signal associated with the DCI. To be specific, in FIG. 3, SF #1, which is the first subframe of SB #0 as the scheduling subband, overlaps (at least partially) two subframes in SB #3, which is the scheduled subband, on the time domain. When the wireless terminal receives DCI addressed to itself through SF #1 of SB #0, even using the SBIF included in the received DCI, the wireless terminal only specifies that the scheduled subband is SB #3 and does not determine which subframe (any one of SF #0 and SF #1) in SB #3 includes the downlink data signal associated with the DCI. The wireless terminal will not specify the position of the downlink data signal corresponding to DCI only using SBIF included in the DCI. This is the aforementioned new problem. Please be noted that the term "subframe", which is the LTE terminology and used here for convenience in explanation of the present invention, may be equivalent to "slot" in 3GPP 5G systems.

In short, with Filtered OFDM, that will be possibly introduced to 5G systems, the band of one OFDM signal is divided into plural subbands, filtering is performed for each subband, and radio parameters (subcarrier spacing, CP (or GI) length, TTI length (or subframe length)) can be set to values that vary from subband to subband. In this case, the same thought as cross-carrier scheduling in LTE systems enables scheduling across multiple subbands. However, it is sometimes difficult to uniquely specify which subframe in the scheduled carrier includes the downlink data signal associated with the downlink control signal even by using any of the parameters in the downlink control signal which are prescribed in LTE. Hereinafter, a description is given of an embodiment of the application to solve this problem.

First Embodiment

A first embodiment is a wireless communication device which receives a data signal and a control signal associated with the data signal from another wireless communication device. The wireless communication device includes: a receiver which receives from the another wireless communication device, a series of frames (corresponding to subframes or slots for example) having a first frame length through a first subband (corresponding to a scheduling subband, for example) while receiving a series of frames (corresponding to subframes or slots, for example) having a second frame length through a second subband (corresponding to a scheduled subband, for example), the second frame length being shorter than the first frame length; and a controller which, when the wireless communication device receives the control signal through a first frame of the first subband and receives the data signal corresponding to the control signal through a plurality of second frames of the second subband, the plurality of second frames overlapping at least part of the first frame in a time direction, specifies which of the plurality of second frames includes the data signal based on predetermined information included in the control signal. Subband may be referred to as a bandwidth part of carrier.

The technical meaning of the first embodiment is described. As explained based on FIG. 3, the band of one OFDM signal is divided into plural subbands (or a plurality of bandwidth parts), filtering is performed for each subband, and TTI (or subframe length) is set to values that vary from subband to subband. When cross-subband scheduling is then performed for a downlink data signal, the wireless terminal does not uniquely extract the downlink data signal associated with the received downlink control information (DCI). This problem is caused because, as described above, the wireless terminal sometimes does not uniquely recognize which of plural subframes (SF #0 and SF #1 of SB #3 in FIG. 3) in the scheduled subband includes the downlink data signal associated with the downlink control information.

In the first embodiment, DCI as the downlink control information is configured to include predetermined information (a subframe indicator, or a slot indicator) indicating which of the plural subframes (or slots) includes the downlink data signal associated with the control signal including the downlink control information (in other words, the downlink data signal to be demodulated based on the downlink control information of interest). This predetermined information may be referred to as a subframe indicator field (SFIF), for example and may be prescribed as one of the parameters included in DCI.

Figure 4:
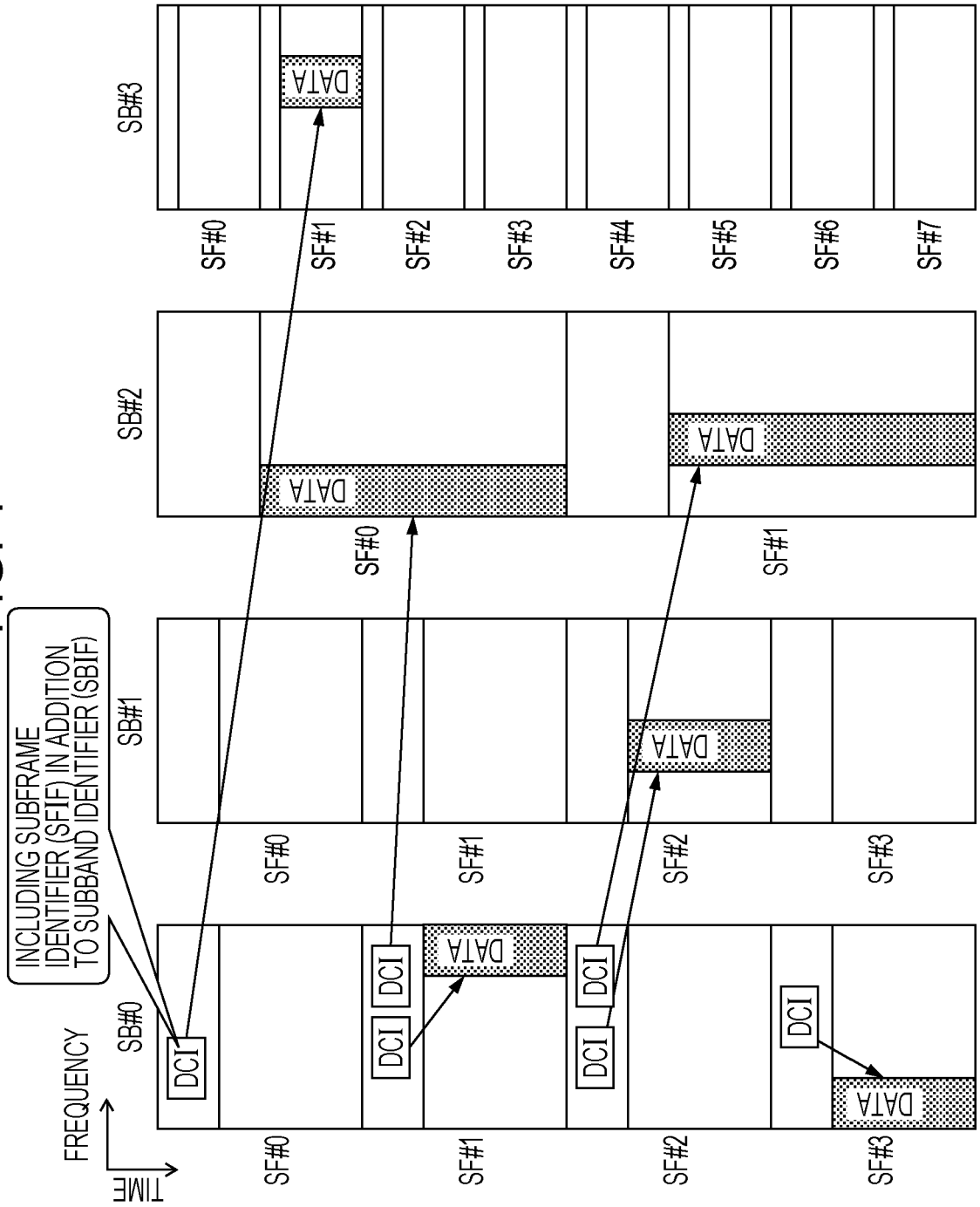
FIG. 4 is a diagram illustrating an example of a first embodiment.

FIG. 4 is a diagram illustrating the first embodiment. As illustrated in FIG. 4, when DCI is configured to include SFIF, the wireless terminal having received the DCI is able to uniquely specify which of the aforementioned plural subframes includes the downlink data signal associated with the DCI, based on the SFIF. The wireless terminal is therefore able to properly demodulate the downlink data signal, thus solving the aforementioned problem.

The SFIF may be composed of a fixed-length bit string, for example. As an example, in the case illustrated in FIG. 4, two subframes (SF #0 and SF #1 of SB #3) is able to be scheduled by DCI. It is therefore sufficient to prepare SFIF of one bit. Specifically, when the downlink data signal associated with DCI included in SF #0 of SB #0 is included in SF #0 of SB #3, SFIF in DCI of interest is set to " 0" that is "0". When the downlink data signal is included in SF #1 of SB #3, SFIF in the DCI is set to " 1" that is "1". This is just an example. When the subframe length of SB #3 is 0.25 ms, for example, DCI is able to schedule four subframes. Therefore, it goes without saying that SFIF of two bits is required.

The wireless terminal requires to previously know the bit length of SFIF. The wireless base station may explicitly notify the wireless terminal of the bit length of SFIF in advance. This notification may be performed through Radio Resource Control (RRC) signal, which is a control signal in an upper layer, for example. The bit length of SFIF may be calculated by the wireless terminal for itself based on the frame length of the scheduling subband and the frame length of the scheduled subband. As an example, when the frame lengths of the scheduling subband and the scheduled subband are 1 and 0.5 ms, respectively, the bit length is calculated as $\log_2(1/0.5)=\log_2 2=1$.

Noted that FIG. 4 corresponds to the case where the beginning line of the time domain of SF #0 in SB #0 and the beginning line of the time domain of SF #0 in SB #3 are aligned. The wireless base station may explicitly or implicitly notify wireless terminals of whether the position of the beginning line of the time domain of a referential subframe (SF #0 in FIG. 4) in the scheduling subband is aligned with that in the scheduled subband. A wireless frame composed of plural subframes may be defined as an upper level frame of subframes, and the first subframe in each wireless frame may be defined as the aforementioned referential subframe. The time length of each wireless frame may be identical across subbands. In such a case, the number of subframes included in one wireless frame of SB #3 is double the number of subframes included in one wireless frame of SB #0.

According to the first embodiment described above, by introducing the aforementioned predetermined information (SFIF), the wireless terminal having received a downlink control signal including SFIF uniquely determines which of the aforementioned plural subframes includes a downlink data signal associated with the downlink control signal. The wireless terminal is therefore able to demodulate and decode the downlink data signal properly, thus solving the aforementioned problem.

[Various Modifications]

Hereinafter, a description is given of various modifications of the aforementioned first embodiment sequentially.

First, a first modification is described. As described above, according to Filtered OFDM, the guard bands between the subbands and the filter of each subband reduce the interference between the subbands. As described above, the radio parameters may be therefore set to values that vary from subband to subband. For example, the subcarrier spacing, TTI length (subframe length), and the like may be set to values from subband to subband. On the other hand, since the interference between subbands is reduced, it is thought that the subframes are not supposed to be synchronized between subbands unlike wireless communication systems based on OFDMA.

Figure 5:
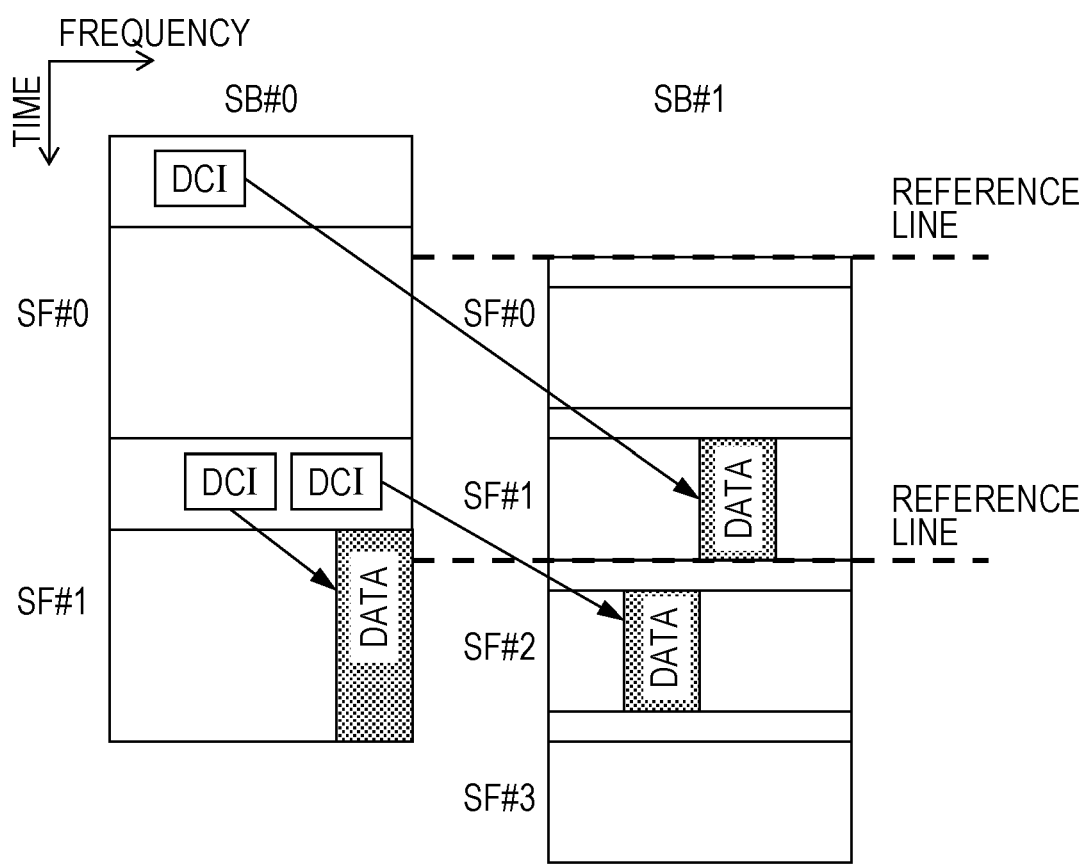
FIG. 5 is a diagram illustrating an example of a first modification.

FIG. 5 illustrates an example of the first modification. In FIG. 5, subframes are not synchronized between subbands. Herein, it is assumed that the subframe length of SB #0 as the scheduling band is 1 ms while the subframe length of SB #1 as the scheduled band is 0.5 ms. The beginning of the subframe SF #0 of SB #0 is not synchronized with the beginning of the subframe SF #0 of SB #1, and there is a gap therebetween in the time direction.

SFIF described above is information to specify the subframe that includes a downlink data signal associated with DCI including the SFIF. In the case illustrated in FIG. 5, it is an issue how to set SFIF. For example, in the scheduled subband SB #1, reference lines (reference times) illustrated in FIG. 5 are provided. SFIF is thereby configured to indicate any one of the subframes in SB #1 that follows the reference line and at least partially overlaps the SF #0 of SB #0 in the time direction. To be specific, when DCI included in SF #1 of SB #0 in FIG. 5 schedules a downlink data signal included in SB #1, for example, the subframes of SB #1 that may include the downlink data signal are two subframes SF #2 and SF #3 (limited to subframes following the reference line). The SFIF is therefore configured to have a one-bit value. When SF #2 of SB #1 includes the downlink data signal associated with the DCI included in SF #1 of SB #0, SFIF of the DCI is set to " 0" that is "0". When SF #3 of SB #1 includes the downlink data signal, SFIF of the DCI is set to " 1" that is "1".

On the other hand, SFIF may be configured to indicate one of the subframes of SB #1 that at least partially overlaps SF #0 of SB #0 in the time direction without providing the aforementioned reference line. To be specific, in order for DCI included in SF #1 of SB #0 in FIG. 5 to schedule a downlink data signal included in SB #1, the subframes of SB #1 that may include the downlink data signal are three subframes SF #1 to SF #3. Accordingly, SFIF is configured to have a two-bit value. When SF #1 of SB #1 includes a downlink data signal associated with the DCI included in SF #1 of SB #0, SFIF in the DCI is set to " 00" that is "00". When SF #2 of SB #1 includes the downlink data signal, SFIF in the DCI is set to " 01" that is "01". When the SF #3 of SB #1 includes the downlink data signal, SFIF in the DCI is set to " 10" that is "10".

There are various methods to notify the wireless terminal from the wireless base station of information concerning the position of the reference line. For example, wireless frames described in the first embodiment may be introduced. The wireless base station notifies the wireless terminal of the difference between starting positions in the time domain, of the wireless frame in the subband on the scheduling side and the wireless frame in the subband on the scheduled side. In this case, the wireless base station may notify the wireless terminal of the information in time length units which are obtained by dividing the time length of the subframes in the subband on the scheduling side into N equal time length units. In this case, N may be set to N={1, 2, 4, 8, 16, 32, 64, . . . }. When the time length of subframes of the subband on the scheduling side is T and N is set to 16, the quantized time difference between the aforementioned wireless frames is expressed using four bits as (log 2(16)=4). When the time difference is greater than 0 and not greater than T/N, 0000. When the time difference is greater than T/N and not greater than 2T/N, 0001. When the time difference is greater than 2T/N and not greater than 3T/N, 0010. In a similar manner, four-bit code patterns may be defined up to the case where the time difference is greater than (N−1)T/N and not greater than N. The wireless base station notifies the wireless terminal of this four-bit code string. The length of the code string depends on the value of N.

Next, a second modification is described. As described in the first modification, according to Filtered OFDM, subframes are not supposed to be synchronized between subbands. The above description is on the premise that the subframe length of the scheduled subband is longer than that of the scheduling subband. However, in the case where subframes are not synchronized between subbands, the same problem as that described above may be caused without the premise.

Figure 6:
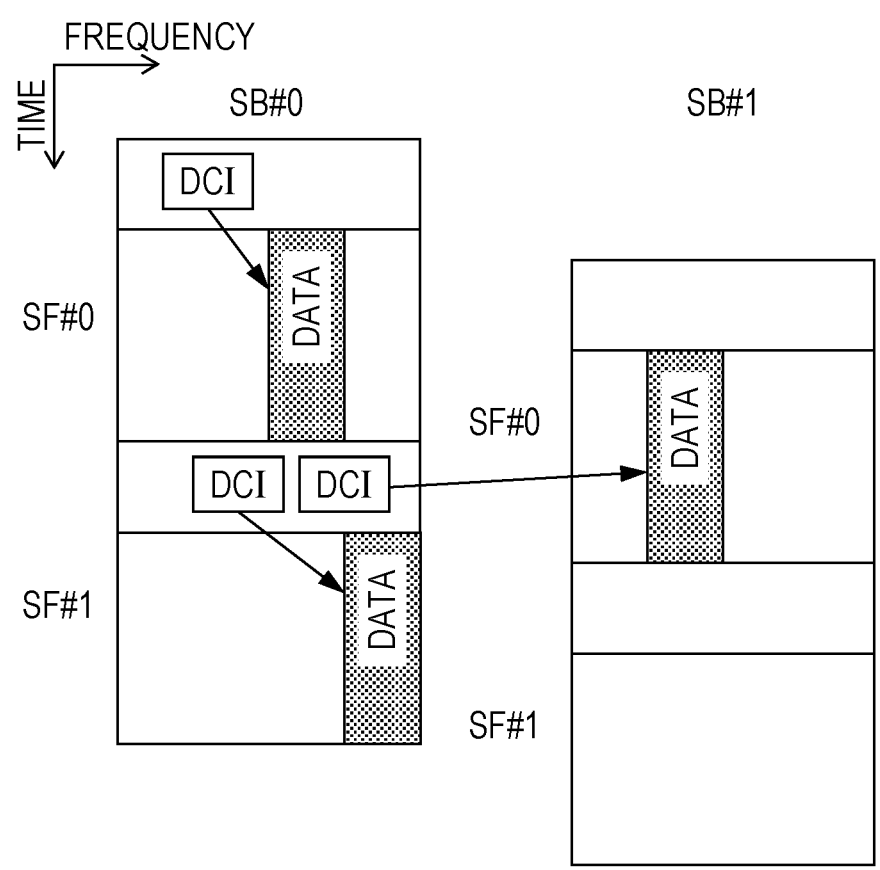
FIG. 6 is a diagram illustrating an example of a second modification.

FIG. 6 illustrates an example of the second modification. FIG. 6 corresponds to the case where the subframe length of SB #0 as the scheduling subband is equal to the subframe length of SB #1 as the scheduled subband. Noted that the same applies to the case where the latter is longer. In FIG. 6, the two subbands have the same subframe length, but the subframes are not synchronized between subbands in the time domain. In other words, the starting positions of the subframes in SB #0 in the time domain are not aligned with those of the subframes in SB #1. In this case, if the reference line concept, described in the first modification, is introduced, SFIF is not required. When the reference line is not provided, however, 1-bit SFIF is required (when DCI included in SF #1 of SB #0 schedules a downlink data signal included in SB #1, the subframes of SB #1 that may include the downlink data signal are two subframes SF #0 and SF #1). In this manner, in the embodiment of the application, noted that it is not required that the subframe length of the scheduled subband is shorter than that of the scheduling subband. To introduce the reference line, the method illustrated in first modification may be used.

[Network Configuration of Wireless Communication System of Embodiment]

Figure 7:
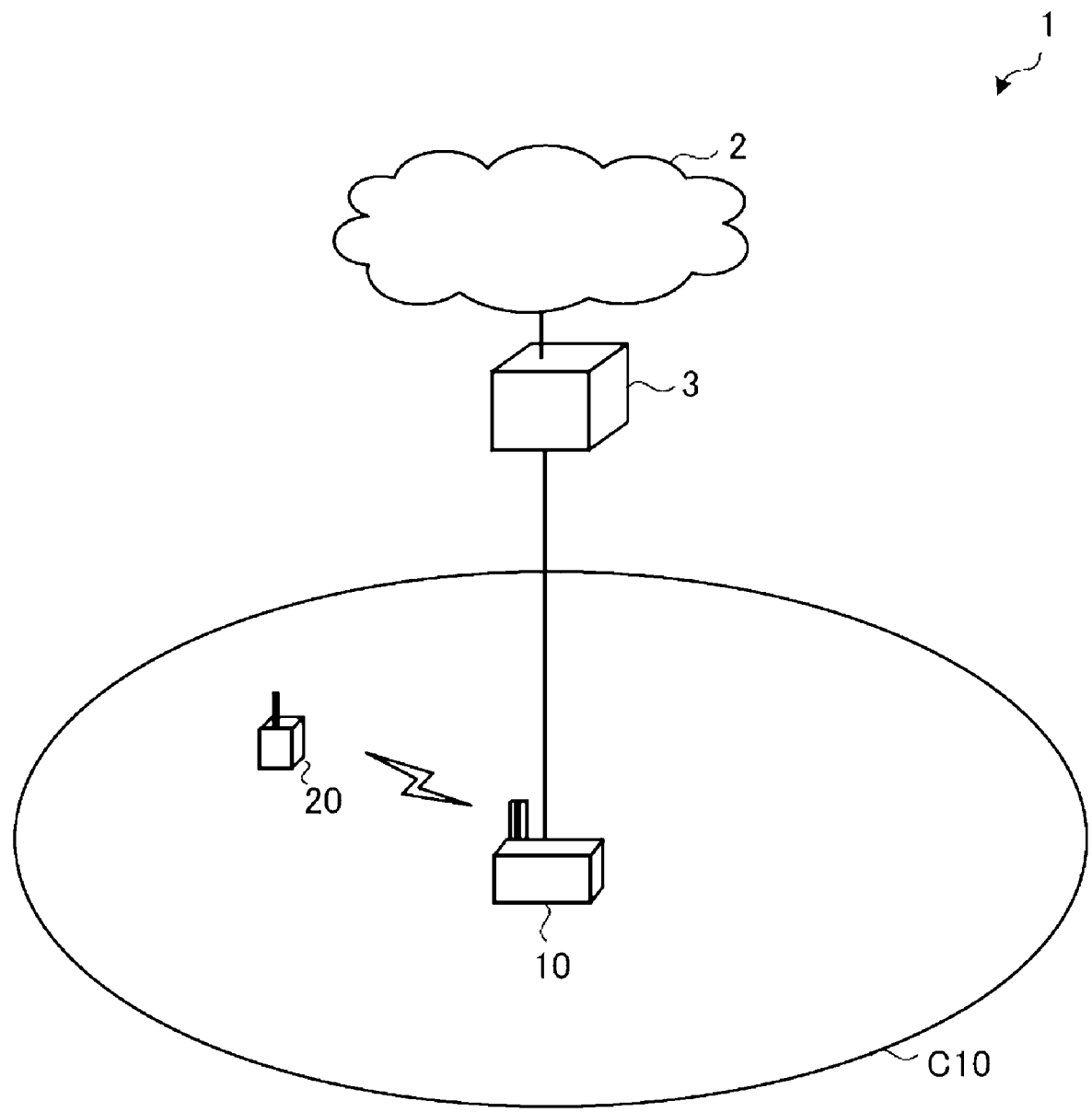
FIG. 7 is a diagram illustrating an example of the network configuration of a wireless communication system of each embodiment.

Next, the network configuration of a wireless communication system 1 of the embodiment is described based on FIG. 7. As illustrated in FIG. 7, the wireless communication system 1 includes a wireless base station 10 and a wireless terminal 20. The wireless base station 10 forms a cell C10. The wireless terminal 20 is located in the cell C10. In this application, the wireless base station 10 is sometimes referred to as a "transmitter station" while the wireless terminal 20 is referred to as a "receiver station".

The wireless base station 10 is connected to a network device 3 via wired connection, and the network device 3 is connected to the network 2 via wired connection. The wireless base station 10 is provided so as to exchange data and control information with another wireless base station through the network device 3 and network 2. The wireless base station 10 may be connected to the network device 3 wirelessly, not by wire.

The function of wireless communication with the wireless terminal 20, the digital signal processing function, and the control function of the wireless base station 10 may be separated as different devices. In this case, the device including the wireless communication function is called a remote radio head (RRH), and the device including the digital signal processing and control function is called a base band unit (BBU). The RRH is provided so as to protrude from the BBU. The RRH and BBU may be connected by wire through an optical fiber or the like or may be connected wirelessly. The wireless base station 10 may be divided into two units of a Central Unit and a Distributed Unit, instead of the RRH and BBU described above, for example. The Distributed Unit includes at least an RF wireless circuit and may additionally include a wireless physical layer (or Layer 1) function, further include a MAC layer function, and still further include an RLC function.

The wireless base station 10 may be a wireless base station of appropriate scale, in addition to a small wireless base station, such as a macro- or pico-wireless base station (including a micro- or a femto-wireless base station). In the case of using a relay station which relays wireless communication between the wireless base station 10 and wireless terminal 20, the relay station (transmission and reception with the wireless terminal 20 and control thereof) may be considered to be included in the wireless base station 10 of the application.

On the other hand, the wireless terminal 20 communicates with the wireless base station 10 through wireless communication.

The wireless terminal 20 may be a wireless terminal such as a mobile phone, a smart phone, a personal digital assistant (PDA), a personal computer, or an appropriate type of apparatus or device having a wireless communication function (a sensor device or the like). In the case of using a relay station which relays wireless communication between the wireless base station 10 and wireless terminal, the relay station (transmission and reception with the wireless base station 10 and control thereof) may be included in the wireless terminal 20 of this application.

The network device 3 includes a communication section and a controller, for example, and these constituent components are connected so that signals and data are exchanged in one direction or both directions. The network device 3 is implemented by a gateway, for example. As for the hardware configuration of the network device 3, the communication section is implemented by an interface circuit, and the controller is implemented by a processor and a memory, for example.

The specific modes of distribution and integration of the constituent components of the wireless base station and wireless terminal are not limited to those of the first embodiment. All or a part thereof may be constituted by functional or physical distribution and integration in appropriate unit, depending on various loads, various usages, and the like. For example, the memory may be connected via a network or a cable as an external device of the wireless base station and terminal.

[Functional Configuration of Device in Wireless Communication System of Embodiment]

Figure 8:
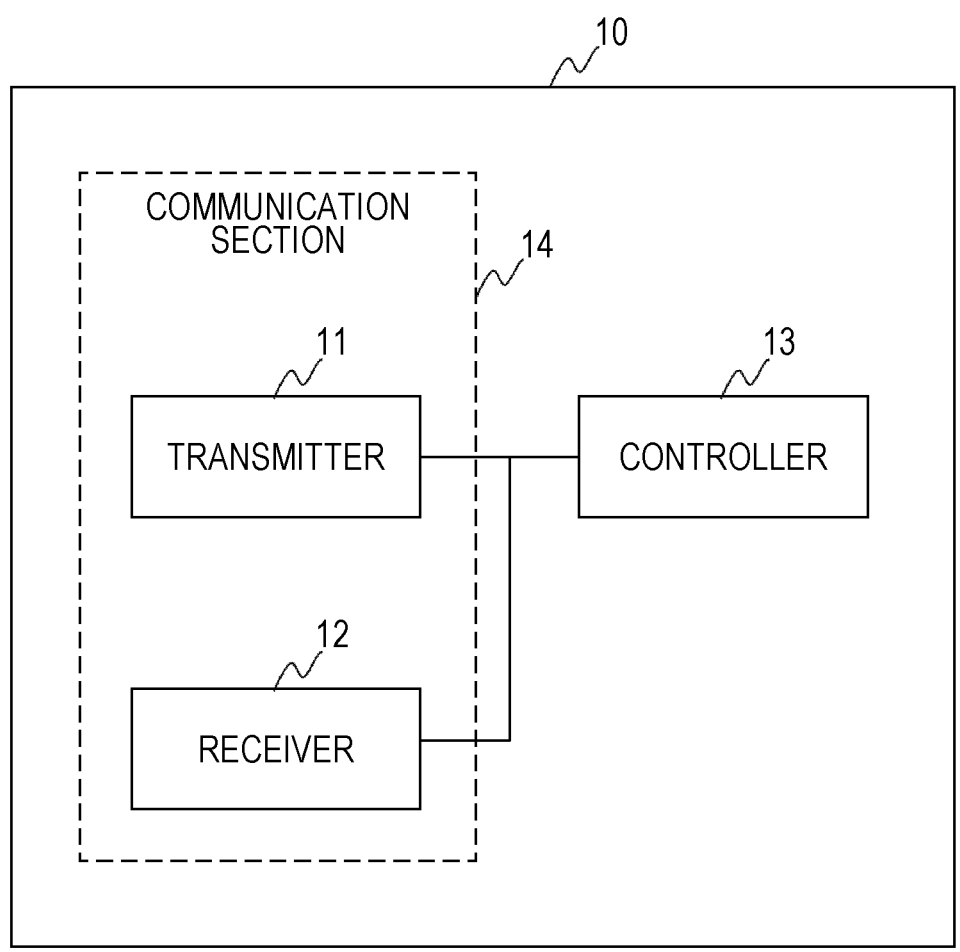
FIG. 8 is an example of the functional configuration diagram of a wireless base station in the wireless communication system of each embodiment.
Figure 9:
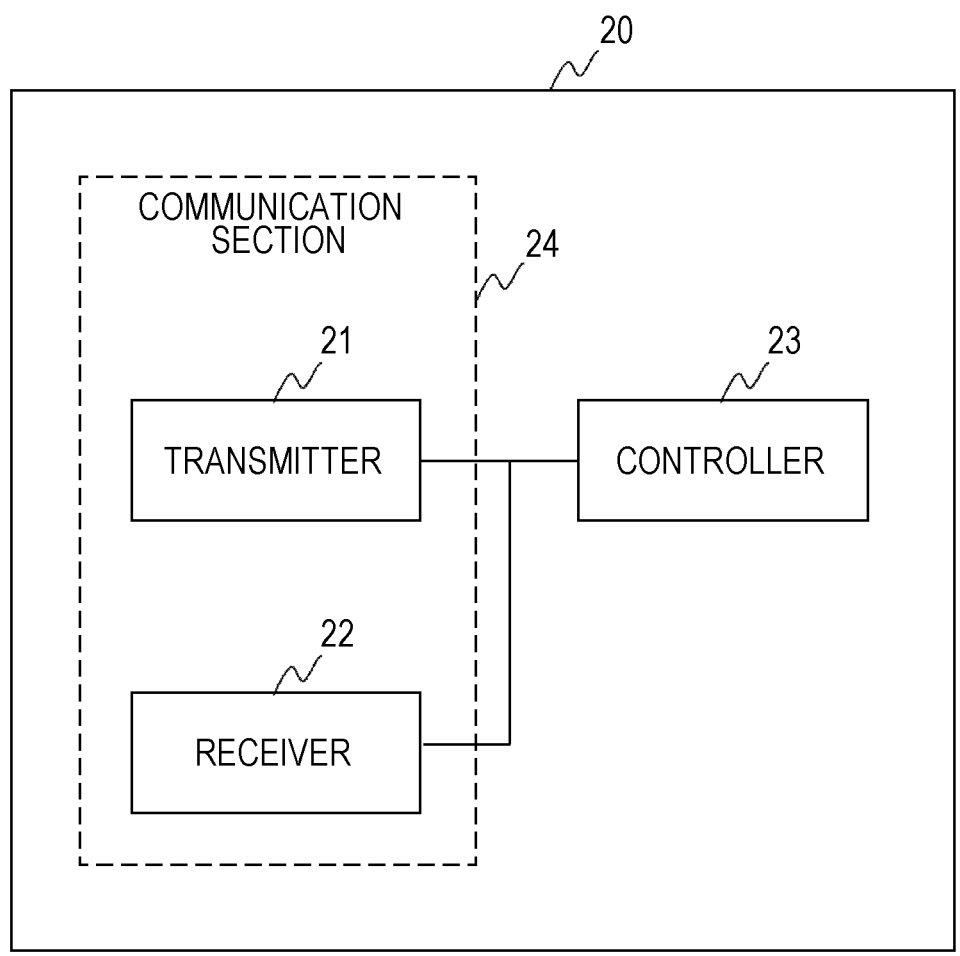
FIG. 9 is an example of the functional configuration diagram of a wireless terminal in the wireless communication system of each embodiment.

Next, based on FIGS. 8 and 9, a description is given of the functional configuration of each device of the wireless communication system of the embodiment.

FIG. 8 is a functional block diagram illustrating the configuration of the wireless base station 10. As illustrated in FIG. 8, the wireless base station 10 includes a transmitter 11, a receiver 12, and a controller 13. These constituent components are connected so as to exchange signals and data in one direction or both directions. The transmitter 11 and receiver 12 are collectively referred to as a communication section 14.

The transmitter 11 transmits data signals and control signals through wireless communication via an antenna. The antenna may be shared by transmission and reception. The transmitter 11 transmits a downlink signal through a downlink data channel or control channel, for example. The downlink data channel includes Physical Downlink Shared Channel (PDSCH), for example. The downlink control channel includes Physical Downlink Control Channel (PDCCH), for example. The transmitted signals include L1/L2 control signals transmitted to the connected wireless terminal 20 through the control channel, user data signals transmitted to the connected wireless terminal 20 through the data channel, and Radio Resource Control (RRC) control signals, for example. The transmitted signals include a synchronization signal and a reference signal used in channel estimation and downlink radio line quality measurement.

The signals transmitted by the transmitter 11 include every signal transmitted by the wireless base station 10 in the aforementioned embodiment and modifications.

The receiver 12 receives the data signals and control signals transmitted from the wireless terminal 20 via an antenna through first wireless communication. The receiver 12 receives uplink signals through an uplink data channel or control channel, for example. The uplink data channel includes Physical Uplink Shared Channel (PUSCH), for example. The uplink control channel includes Physical Uplink Control Channel (PUCCH), for example. The received signals include L1/L2 control signals transmitted from the connected wireless terminal 20 through the control channel, user data signals transmitted from the connected wireless terminal 20 through the data channel, and Radio Resource Control (RRC) control signals, for example. The received signals include a reference signal used in channel estimation and downlink radio line quality measurement, for example.

The signals received by the receiver 12 include every signal received by the wireless base station 10 in the aforementioned embodiment and modifications.

The controller 13 outputs to the transmitter 11, data and control information to be transmitted. The controller 13 receives from the receiver 12, data and control information received. The controller 13 acquires data and control information from the network device 3 and another wireless base station through wired or wireless connection. In addition to the aforementioned various processes, the controller performs various controls related to various transmitted signals to be transmitted by the transmitter 11 and various received signals received by the receiver 12.

The processes controlled by the controller 13 include every process executed by the wireless base station 10 in the aforementioned embodiment and modifications.

FIG. 9 is a functional block diagram illustrating the configuration of the wireless terminal 20. As illustrated in FIG. 9, the wireless terminal 20 includes a transmitter 21, a receiver 22, and a controller 23. These constituent components are connected so as to exchange signals and data in one direction or both directions. The transmitter 21 and receiver 22 are collectively referred to as a communication section 24.

The transmitter 21 transmits data signals and control signals through wireless communication via an antenna. The antenna may be shared by transmission and reception. The transmitter 21 transmits an uplink signal through an uplink data channel or control channel, for example. The uplink data channel includes Physical Uplink Shared Channel (PUSCH), for example. The uplink control channel includes Physical Uplink Control Channel (PUCCH), for example. The transmitted signals include L1/L2 control signals transmitted to the connected wireless base station 10 through the control channel, user data signals transmitted to the connected wireless base station 10 through the data channel, and Radio Resource Control (RRC) control signals, for example. The transmitted signals include a reference signal used in channel estimation and demodulation, for example.

The signals transmitted by the transmitter 21 include every signal transmitted by the wireless terminal 20 in the aforementioned embodiment and modifications.

The receiver 22 receives data signals and control signals transmitted from the wireless base station 10 via an antenna through wireless communication. The receiver 22 receives downlink signals through a downlink data channel or control channel, for example. The downlink data channel includes Physical Downlink Shared Channel (PDSCH), for example. The downlink control channel includes Physical Downlink Control Channel (PDCCH), for example. The received signals include L1/L2 control signals transmitted from the connected wireless base station 10 through the control channel, user data signals transmitted from the connected wireless base station 10 through the data channel, and Radio Resource Control (RRC) control signals, for example. The received signals include a reference signal used in channel estimation and demodulation, for example.

The signals received by the receiver 22 include every signal received by the wireless terminal 20 in the aforementioned embodiment and modifications.

The controller 23 outputs to the transmitter 21, data and control information to be transmitted. The controller 23 receives from the receiver 22, data and control information received. The controller 23 acquires data and control information from the network device 3 and another wireless base station through wired or wireless connection. In addition to the aforementioned various processes, the controller performs various controls related to various transmitted signals to be transmitted by the transmitter 21 and various received signals received by the receiver 22.

The processes controlled by the controller 23 include every process executed by the wireless terminal 20 in the aforementioned embodiment and modifications.

PDSCH, PDCCH, PUSCH, and PUCCH described above are the names of wireless physical channels used in the wireless access part of LTE systems, but the embodiment of the application is certainly not limited to these. It goes without saying that the names of wireless physical channels in 5G systems and the like have the potential to be different from these names. Noted that the names of wireless physical channels in 5G systems and the like may be applied to the embodiment of the application.

[Hardware Configuration of Devices in Wireless Communication System of Embodiment]

Figure 10:
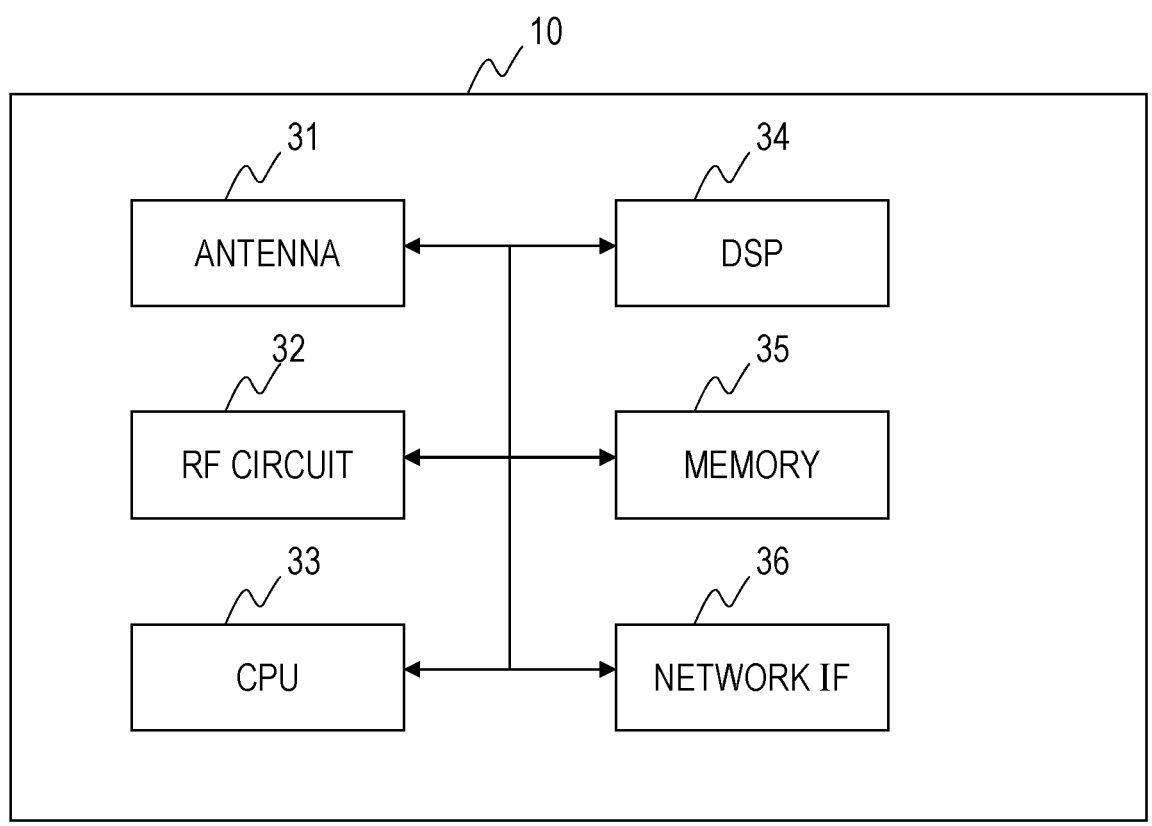
FIG. 10 is an example of the hardware configuration diagram of the wireless base station in the wireless communication system of each embodiment.
Figure 11:
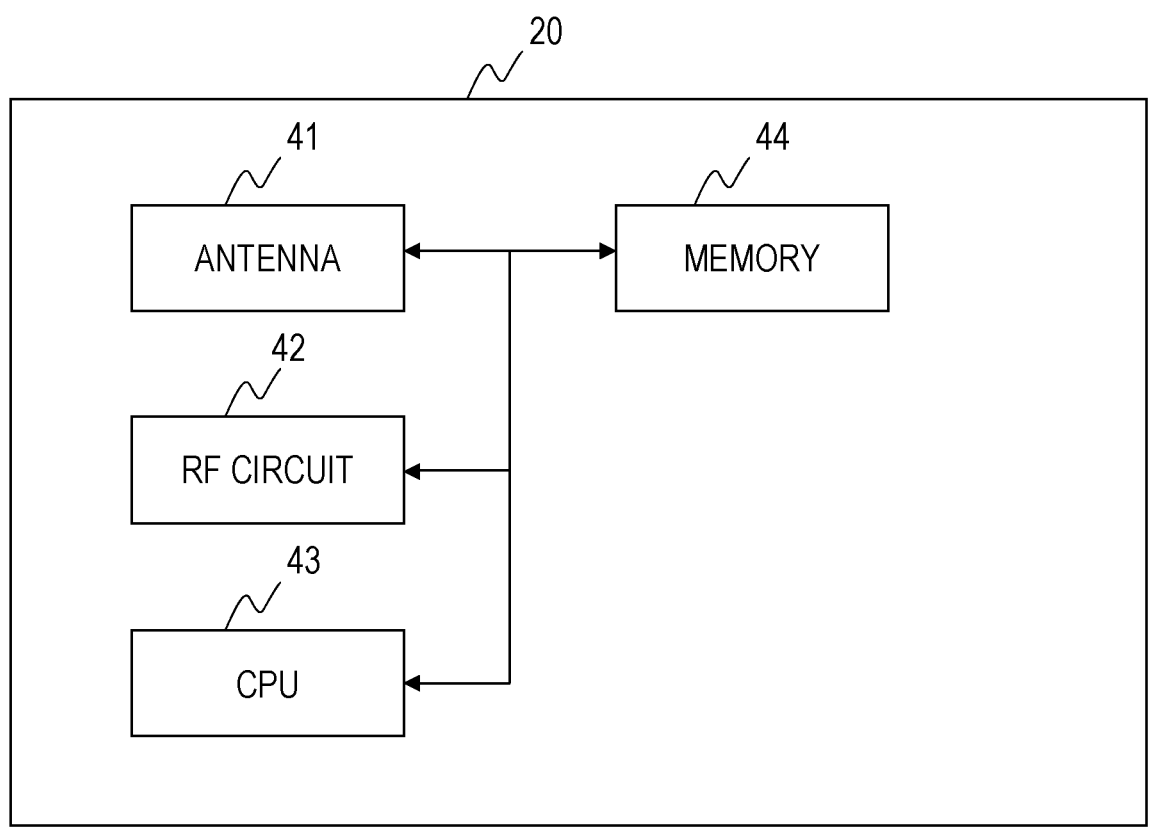
FIG. 11 is an example of the hardware configuration diagram of the wireless terminal in the wireless communication system of each embodiment.

Based on FIGS. 10 and 11, a description is given of the hardware configuration of each device in the wireless communication system of the embodiment and modifications.

FIG. 10 is a diagram illustrating the hardware configuration of the wireless base station 10. As illustrated in FIG. 10, the wireless base station 10 includes a radio frequency (RF) circuit 32 including an antenna 31, a central processing unit (CPU) 33, a digital signal processor (DSP) 34, a memory 35, and a network interface (IF) 36, as the hardware constituent components, for example. The CPU is connected so as to receive and transmit various signals and data via a bus. The memory 35 includes at least one of a random access memory (RAM), such as a synchronous dynamic random access memory (SDRAM), a read only memory (ROM), and a flash memory, for example and stores programs, control information, and data.

A description is given of the correspondence between the functional configuration of the wireless base station 10 illustrated in FIG. 8 and the hardware configuration of the wireless base station 10 illustrated in FIG. 10. The transmitter 11 and receiver 12 (or communication section 14) are implemented by the RF circuit 32 or the antenna 31 and RF circuit 32, for example. The controller 13 is implemented by the CPU 33, DSP 34, memory 35, a not-illustrated digital electronic circuit, and the like, for example. Examples of the digital electronic circuit include an Application Specific Integrated Circuit (ASIC), a field-programming gate array (FPGA), and large scale integration (LSI).

The wireless base station 10 generates plural data signals to be transmitted through plural subbands. The filter to generate the data signals may be configured independently for each subband.

FIG. 11 is a diagram illustrating the hardware configuration of the wireless terminal 20. As illustrated in FIG. 11, the wireless terminal 20 includes an RF circuit 42 provided with an antenna 41, a CPU 43, and a memory 44 as the hardware constituent components, for example. The wireless terminal 20 may include a display apparatus such as a liquid crystal display (LCD) connected to the CPU 43. The memory 44 includes at least one of RAM, such as SDRAM, ROM, and flash memory, for example and stores programs, control information, and data.

A description is given of the correspondence between the functional configuration of the wireless terminal 20 illustrated in FIG. 9 and the hardware configuration of the wireless terminal 20 illustrated in FIG. 11. The transmitter 21 and receiver 22 (or communication section 24) are implemented by the RF circuit 42 or the antenna 41 and RF circuit 42, for example. The controller 23 is implemented by the CPU 43, memory 44, a not-illustrated digital electronic circuit, and the like, for example. Examples of the digital electronic circuit include ASIC, FPGA, and LSI.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication device which receives a data signal and a first control signal associated with the data signal from another wireless communication device, the wireless communication device comprising:
    a receiver configured to receive, from the another wireless communication device, a series of first frames having a first frame length through a first subband and a series of second frames having a second frame length through a second subband, the second frame length differing from the first frame length; and
    a processor configured to:
    obtain the first control signal of the first frame through the first subband and the data signal of the second frames through the second subband, the data signal being associated with the first control signal, and
    specify which of the second frames includes the data signal, based on predetermined information included in the first control signal, wherein the obtaining of the data signal of the second frames through the second subband is conducted without being based on the specifying of which of the second frames includes the data signal, based on the predetermined information included in the first control signal,
    wherein the processor is configured to obtain information for indicating size of the predetermined information in a second control signal received from the another wireless communication device.

2. The wireless communication device according to claim 1,
    wherein the first control signal includes information for demodulating and decoding the data signal.

3. The wireless communication device according to claim 1,
    wherein the second frame length is shorter than the first frame length.

4. The wireless communication device according to claim 1, wherein the processor is configured to obtain information of a ratio of the first frame length to the second frame length in the second control signal.

5. The wireless communication device according to claim 1,
    wherein a beginning line of a first frame of the first frames and the beginning line of a second frame of the second frames are aligned in a time domain.

6. A wireless communication device which transmits a data signal and a first control signal associated with the data signal to another wireless communication device, the wireless communication device comprising:
    a transmitter configured to transmit, to the another wireless communication device, a series of first frames having a first frame length through a first subband and a series of second frames having a second frame length through a second subband, the second frame length differing from the first frame length; and
    a processor configured to:
    generate the first control signal of the first frame through the first subband and the data signal of the second frames through the second subband, the data signal being associated with the first control signal, and
    include, in the first control signal, predetermined information configuring the another wireless communication device to specify which of the second frames includes the data signal,
    wherein the transmitter is configured to transmit, to the another wireless communication device, the data signal of the second frames through the second subband without being based on the specifying of which of the second frames includes the data signal, based on the predetermined information included in the first control signal,
    wherein the processor is configured to generate information for indicating size of the predetermined information in a second control signal to be transmitted to the another wireless communication device.

7. The wireless communication device according to claim 6,
    wherein the first control signal includes information for demodulating and decoding the data signal.

8. The wireless communication device according to claim 6, wherein the second frame length is shorter than the first frame length.

9. The wireless communication device according to claim 6, wherein the processor is configured to generate information of a ratio of the first frame length to the second frame length in the second control signal.

10. The wireless communication device according to claim 6,
wherein a beginning line of a first frame of the first frames and the beginning line of a second frame of the second frames are aligned in a time domain.

11. A wireless communication device which transmits or receives a data signal and a control signal associated with the data signal to or from another wireless communication device, respectively, the wireless communication device comprising:
a circuit configured to:
transmit, to the another wireless communication device, a series of first frames having a first frame length through a first subband and a series of second frames having a second frame length through a second subband, the series of second frames not synchronizing with the series of first frames, the second frame length differing from the first frame length, and
receive, from the another wireless communication device, a series of third frames having a third frame length through a third subband and a series of fourth frames having a fourth frame length through a fourth subband, the series of fourth frames not synchronizing with the series of third frames, the fourth frame length differing from the third frame length; and
a processor configured to:
generate a first control signal of the first frame through the first subband and a first data signal of the second frames through the second subband, the first data signal being associated with the first control signal,
include, in the first control signal, predetermined information specifying which of the second frames includes the first data signal,
obtain a second control signal of the third frame through the third subband and a second data signal of the fourth frames through the fourth subband, the second data signal being associated with the second control signal, and
specify which of the fourth frames includes the second data signal, based on predetermined information included in the second control signal,
wherein the obtaining of the second data signal of the fourth frames through the fourth subband is conducted without being based on the specifying of which of the fourth frames includes the second data signal, based on the predetermined information included in the second control signal,
wherein the processor is configured to generate information for indicating size of the predetermined information in a second control signal to be transmitted to the another wireless communication device.

* * * * *